Dec. 22, 1942.　　W. PABST ET AL　　2,306,137
STRESS DETERMINING DEVICE
Filed Sept. 23, 1938　　3 Sheets-Sheet 3

Inventors,
Wilhelm Pabst and Werner Knoll,
by Frank S. Appleman,
Attorney.

Patented Dec. 22, 1942

2,306,137

UNITED STATES PATENT OFFICE 2,306,137

STRESS DETERMINING DEVICE

Wilhelm Pabst and Werner Knoll, Hamburg, Germany; vested in the Alien Property Custodian Application September 23, 1938, Serial No. 231,436
In Germany August 9, 1938

1 Claim. (Cl. 265—1)

This invention relates to measuring instruments and has special reference to an apparatus and method for measuring such stresses as are due to effects of elongation, torsion, pressure, and kindred types of distortion.

More particularly, the invention relates to a measuring apparatus wherein the measurements are determined by comparison of the oscillations of tensioned vibrating wires, the vibration of one wire being controlled or governed by the stress to be measured.

One important object of the present invention is to provide a novel apparatus and method for the purpose set forth, wherein the two wires are kept constantly vibrating by actuating electro-magnets arranged in independent oscillating circuits whereby ample time is provided for performing the manual operations incident to effecting the measurement.

A second important object of the invention is to provide means for optically comparing the oscillations of the two wires.

With the above and other objects in view, the invention consists of the method and apparatus hereinafter fully described and particularly pointed out in the appended claims, the apparatus being disclosed in the accompanying drawings.

In the drawings, like characters of reference indicate like parts in the several views, and—

Figure 1:
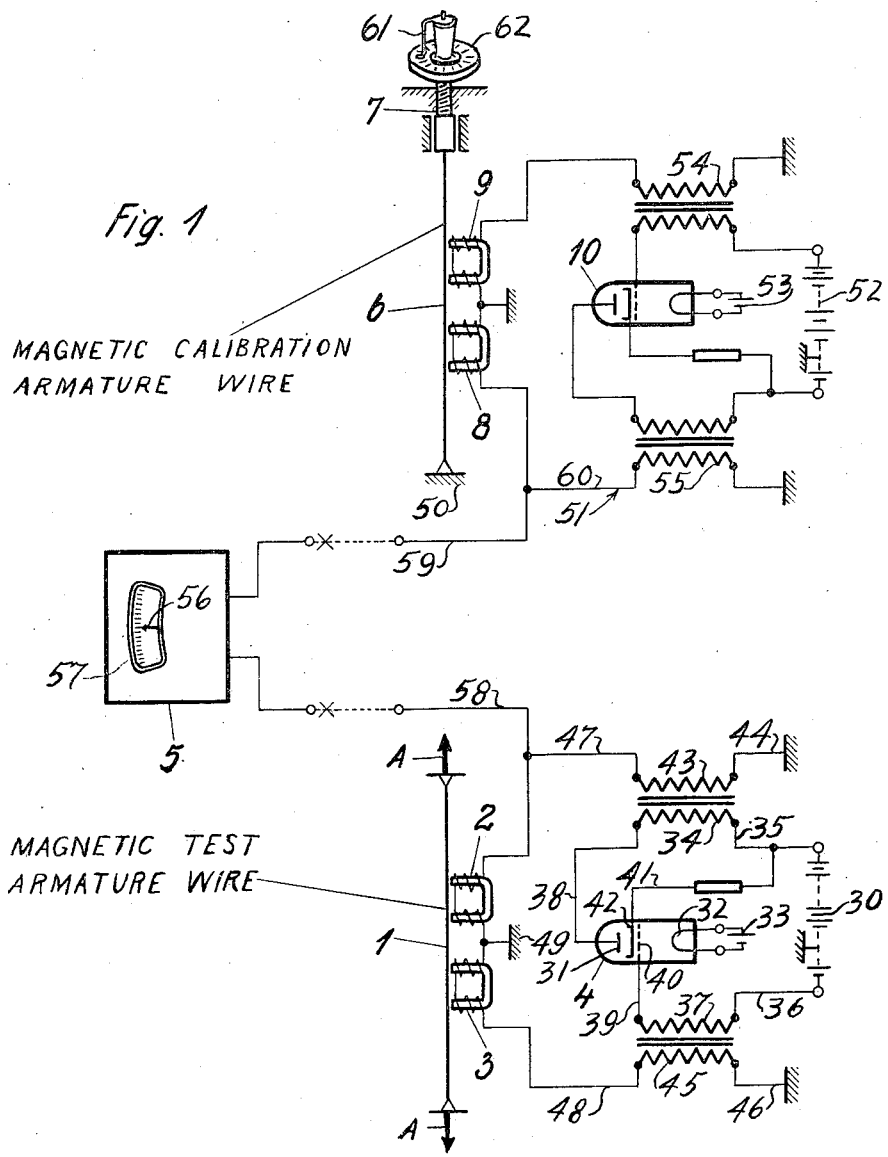
Figure 1 illustrates a general diagram of one form of the complete apparatus including a comparison device for the two circuits.
Figure 6:
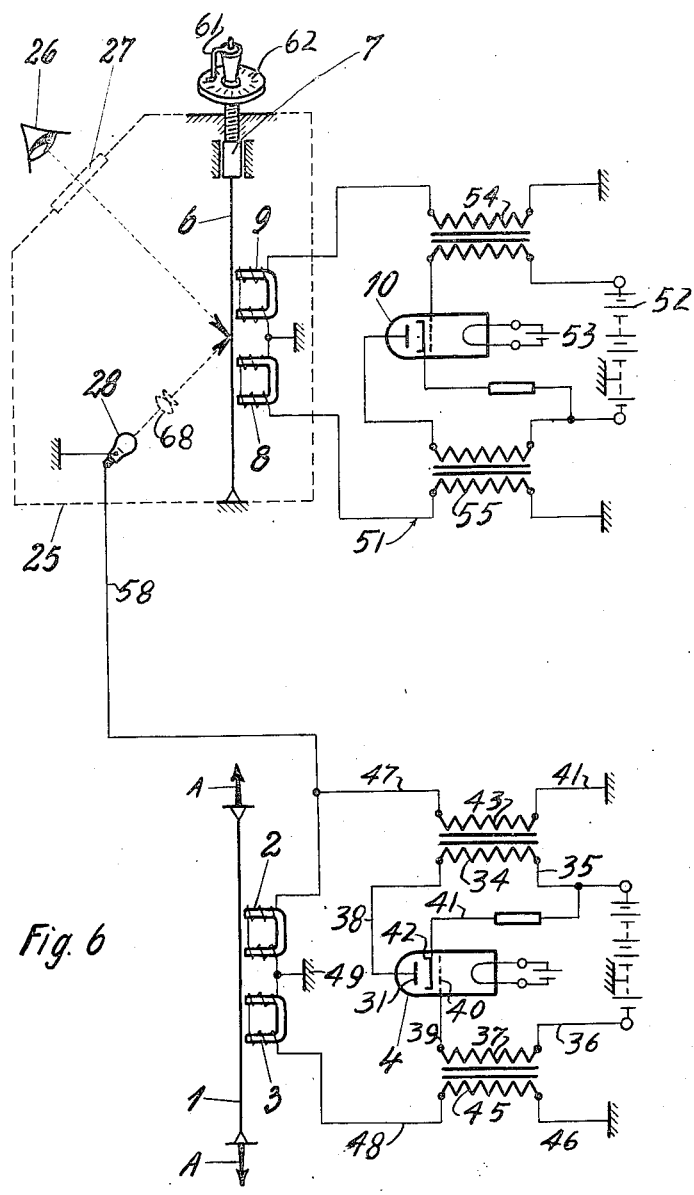
Figure 6 illustrates a view similar to Figure 1, but employing a stroboscopic comparison device.

In the forms of the invention shown in Figures 1 and 6, there is illustrated a wire 1 held under tension by the stress in the object whose distortion under stress is to be measured. The action of the object under stress is illustrated by the arrows A. At 30 is a source of direct current here shown as a battery. At 4 is a four element tube having an anode 31 and a filament 32, current being supplied to the latter from the battery 33. One terminal of the battery 30 is connected to one terminal of a transformer primary 34 by a conductor 35 and the other terminal of the battery 30 is connected by a conductor 36 to one terminal of a transformer primary 37. A conductor 38 connects the remaining terminal of the primary 34 to the anode 31. The remaining terminal of the primary 37 is connected by a conductor 39 to the grid 40 of the tube 4. Conductor means 41 connects the conductor 35 with the screen-grid 42 of the tube 4. A transformer secondary 43 is associated with the primary 34 and a conductor 44 grounds one terminal of this secondary. A transformer secondary 45 is associated with the primary 37 and has one terminal grounded through a conductor 46. At 2 and 3 are a pair of electro-magnets so positioned in relation to the wire 1, which is of magnetic material, that the wire constitutes an armature for these magnets. A conductor 47 connects the remaining terminal of the secondary 43 with one end of the winding of the magnet 2 and a conductor 48 connects the remaining terminal of the secondary 45 with one end of the winding of the magnet 3. The remaining ends of the magnet windings are grounded as at 49.

The apparatus also includes a comparison wire 6 of magnetic material, one end of which is anchored as at 50. The other end of the wire 6 is connected to a tensioning screw 7 by the operation of which tension on the wire 6, and consequently its normal period of vibration, may be regulated. Magnets 8 and 9 are so positioned that the wire 6 constitutes an armature for these magnets. A circuit arrangement 51 exactly similar to that described in connection with the magnets 2 and 3 is associated with the magnets 8 and 9, the arrangement having a four element tube 10, batteries 52 and 53, and transformers 54 and 55. Because of the identity of the two arrangements, the various conductive connections of the arrangement 51 are not deemed necessary here to be described.

In the form of the invention shown in Figure 1, there is disclosed a comparison device 5 having a pointer 56 which traverses a scale 57 in either direction from the central or zero point of the scale. A conductor 58 connects one side of the instrument 5 to the conductor 47 of the test unit and a conductor 59 connects the other side of the instrument 5 to the conductor 60 of the standard unit.

By means of the circuits thus formed, the magnets 2 and 3 and the magnets 8 and 9 will have oscillatory currents established in their windings which will cause vibrations in the wires 1 and 6. It will be obvious to anyone skilled in the art that the current supplying these circuits is an alternating current. This is mentioned only because one knowing nothing of this art might suppose a direct current could be used, which is obviously impossible. Since the natural period of vibration of any wire is a function of the tension exerted longitudinally of the wire, the wire 1 will have an oscillatory period dependent upon the stress therein which is, in turn, governed by the stress in the object under examination. The oscillations of the wires 1 and 6 will react upon the cores of the magnets 2 and 3 and the magnets 8 and 9 which will, in turn, react upon the secondary circuits, thus causing the pointer 56 to move in one direction or the other unless the wires vibrate in unison, thus eliminating the heterodyning effect. If the pointer moves in this manner, tension on the comparison wire 6 is adjusted by rotating the screw 7 until the pointer rests at the zero point of the scale 57. In order to determine the tension on the wire 6, the screw 7 may be provided with a pointer 61 traversing a scale 62 which may be graduated to read in suitable stress units.

Figure 2:
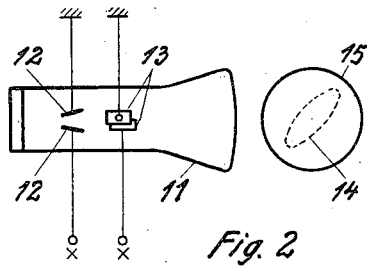
Figure 2 illustrates a diagram of a form of comparison device utilizing an electron ray.

In the form of the comparison device shown in Figure 2, there is shown a cathode ray tube 11 provided with conventional means for producing an electronic ray 61' which impinges upon a screen 14. This ray passes between two pairs of plates 12 and 13, the pair 13 being at right angles to the pair 12. One of the plates 12 is connected to the conductor 58 and the conductor 59 is connected to one of the plates 13. The remaining plates 12 and 13 are grounded as at 62' and 63, respectively.

Figure 3:
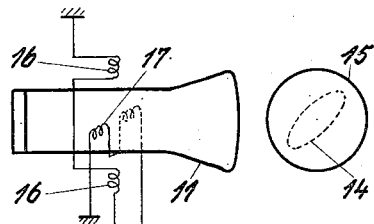
Figure 3 illustrates a diagram of a modified form of the device shown in Figure 2.

Similarly, in Figure 3 there is provided the tube 11 and screen 14 but in this form the plates are replaced by pairs of coils 16 and 17, one pair having its coils at right angles to the other pair so that the electronic ray 61' passes between the coils of the respective pairs. The conductors 58 and 59 are each connected to one coil of a respective pair. Each pair of coils is connected in series and the pairs are grounded as at 64 and 65.

Figure 4:
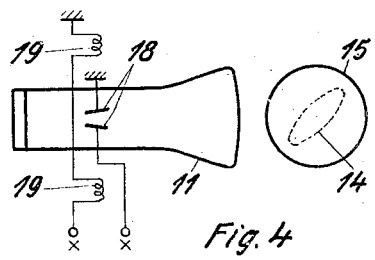
Figure 4 illustrates a diagram of a second modification of the device shown in Figure 2.

Figure 4 illustrates a further modification employing a single pair of plates 18 and a single pair of coils 19 connected and grounded as before.

In each of these forms, the oscillatory currents flowing through the conductors 58 and 59 cause the ray 61 to oscillate, thus producing Lissajou figures 15 on the screens 14. Whenever a heterodyning effect exists, the Lissajou figure produced will change in shape or in position, or in both shape and position. When, however, the wires 1 and 6 oscillate in unison or in orthodynic relation, the Lissajou figure will maintain constant shape and position.

Figure 5:
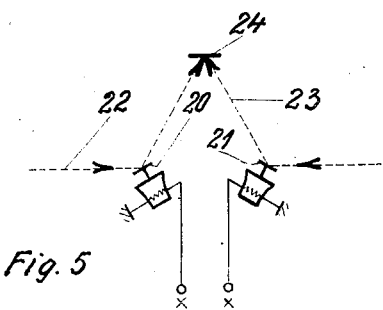
Figure 5 illustrates a diagram showing a form of comparison device employing electro-magnetically controlled mirrors.

In the form of the comparing device shown in Figure 5, there is provided a pair of mirrors 20 and 21 oscillating under the influence of magnetic means 66 and 67 receiving current from the conductors 58 and 59. Light rays 22 impinge upon these mirrors and are reflected to a screen 24 on which when the circuits are in orthodynic relation, they form a closed and stationary Lissajou figure.

In the form shown in Figure 6, a housing 25 is provided with an opening 26 through which the eye 27 of an observer may observe a point on the wire 6 which is in constant vibration. An incandescent lamp 28 emits light intermittently in conformity to the flow of current through the conductor 58, the conductor 59 being omitted in this form. Under these conditions, the light from the lamp 28, transmitted through a suitable lens arrangement, impinges upon a point upon the wire 6 which, due to the stroboscopic effect, appears to be stationary whenever the wires 1 and 6 are in orthodynic relation, since each flash of light from the lamp will strike the wire 6 when the latter is at a definite position of oscillation.

30 indicates a battery which is used for starting the operation and corresponds to an anode battery (B battery), while the filament heating battery (A battery) is shown at 33. It is perfectly obvious that these two batteries will not continuously discharge their current into tube 4, but that a switch (not shown) is provided, as usual, for the purpose of closing the circuit when the apparatus is to be set in motion. This switch is of a conventional type. With regard to the mode of operation of the apparatus, which is actually in use for the purpose stated with special advantage in many cases and which, in the manner described, is easily understood, the following is to be noted: The switching in of the anode battery 30, with the aid of the above mentioned switch, will produce a sudden surge or impulse of voltage, as the potential in the anode circuit jumps from zero to the value of the anode voltage. The switching in of the anode battery is, therefore, like all switching performance, an alternating current operation as a result of the sudden change in potential. This means that this voltage impulse caused by said switching also occurs in the secondary winding of the output transformer to which it is inductively transmitted. The energization winding of the motor magnets 2 or 8, is, however, also in the circuit of the secondary winding of this output transmitter, i. e. the excitation magnet is energized for a short period by the voltage impulse occurring at the instant of the switching of the anode battery, and, as a result, the measuring string is also attracted for a short period.

The movement made by the measuring string will react upon the second magnet 3 or 9 to produce an induction change, since the measuring string made of steel moves in the manner of an "armature" at the poles of said magnets 3 or 9, thus producing in their windings for a short period, by its movement an electromotive force (EMF), which will reach, through cable 48 or 60, the input transformer, and from there will pass inductively to the grid of the amplifier tubes 4 or 10. This input energy is amplified in the tubes and is fed back through the output transformer to the magnets 2 or 8.

This return coupling operation will cause the strings to gradually swing from their natural frequencies to a condition of mechanical vibration the amplitude of which, at first, increases continuously. After a certain period, however, a constant amplitude is obtained as a result of the damping produced in the return coupling circuit.

The above described operation from the initial vibration, the state of maintained vibration until constancy of amplitude is achieved, which is performed in a fraction of a second, is referred to in the technical literature as mechanical-electric return coupling.

According to a different theory the operation finds its explanation in the fact that due to the sensitiveness of the apparatus the strings 6 and 1 are never in a complete position of rest, but are continuously performing small vibrations, which will likewise function to produce the necessary state for the measuring procedure, i. e., vibrations of the strings, which are then strengthened by the magnets.

The tubes 4 and 10 merely function in the present measuring procedure, in accordance with the above described return coupling operation, for the purpose of maintaining the measuring strings in a constant state of vibration and for equalizing the loss due to damping. The tubes per se, have no function in the measuring indication obtained by means of the electron ray tube.

We claim:

In apparatus of the class described, a first tensioned wire of magnetic material adapted to be tensioned by the stress in an object wherein the stress is to be measured, a second independently tensioned wire of magnetic material, manually controlled means for adjusting the tension of the second wire, a first oscillatory circuit for the first wire including electro-magnetic means for which the first wire forms an armature, a second oscillatory circuit for the second wire, having substantially the same construction and characteristics as the first oscillatory circuit, including electro-magnetic means for which the second wire forms an armature, the electro-magnetic means serving to keep the wires constantly in vibration, and means to compare the oscillations in said circuits, said wires each being free from the oscillatory field of the other.

WILHELM PABST.
WERNER KNOLL.